(12) United States Patent
Konno

(10) Patent No.: US 7,245,210 B2
(45) Date of Patent: Jul. 17, 2007

(54) VEHICLE ELECTRONIC KEY SYSTEM

(75) Inventor: Takeshi Konno, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 175 days.

(21) Appl. No.: 10/529,104

(22) PCT Filed: Sep. 25, 2003

(86) PCT No.: PCT/JP03/12271

§ 371 (c)(1),
(2), (4) Date: Mar. 24, 2005

(87) PCT Pub. No.: WO2004/028872

PCT Pub. Date: Apr. 8, 2004

(65) Prior Publication Data

US 2005/0280499 A1   Dec. 22, 2005

(30) Foreign Application Priority Data

Sep. 26, 2002 (JP) .............................. 2002-281781

(51) Int. Cl.
G05B 19/00 (2006.01)
B60R 25/10 (2006.01)
H04Q 7/00 (2006.01)
H04B 1/00 (2006.01)
H04B 17/00 (2006.01)

(52) U.S. Cl. .................... 340/502; 340/5.1; 340/5.2; 340/5.3; 340/5.61; 340/426.22; 340/427; 340/539.11; 340/825.72; 307/10.2; 307/10.5; 455/63.1; 455/67.11

(58) Field of Classification Search ................. 340/53, 340/5.31, 5.32, 5.33, 5.61, 5.62, 5.65, 5.72, 340/426.11, 5.1, 5.2, 5.3, 539.11, 825.72; 307/10.5, 10.2; 455/63.1, 67.11
See application file for complete search history.

(56) References Cited

U.S. PATENT DOCUMENTS 4,688,036 A    8/1987   Hirano et al.
5,157,389 A *  10/1992  Kurozu et al. ............... 340/5.3

(Continued)

FOREIGN PATENT DOCUMENTS

DE           10034348        1/2002

(Continued)

*Primary Examiner*—Benjamin C. Lee
*Assistant Examiner*—Lam Pham
(74) *Attorney, Agent, or Firm*—Carrier, Blackman and Associates, P.C.; Joseph P. Carrier; William D. Blackman

(57) ABSTRACT

A vehicle electronic key system includes a control device mounted on a vehicle and an electronic key for transmitting a response signal in response to reception of a request signal from the control device. The control device includes means for outputting a request signal to the electronic key in response to the ON operation of a main switch of the vehicle (request signal generation means, a transmission circuit, and a transmission antenna), means for detecting a response signal from the electronic key (a reception circuit and response signal matching means), and means for performing an alarm output (monitoring means, a third drive circuit, and an alarm lamp) when no response signal is detected in spite of the output of the request signal.

6 Claims, 8 Drawing Sheets

U.S. PATENT DOCUMENTS

| | | | |
|---|---|---|---|
| 5,293,160 A * | 3/1994 | Kurozu et al. | 340/5.3 |
| 5,343,077 A * | 8/1994 | Yoshida et al. | 340/5.64 |
| 5,689,142 A | 11/1997 | Liu | |
| 5,939,975 A * | 8/1999 | Tsuria et al. | 340/426.18 |
| 6,057,657 A | 5/2000 | Kitamura | |
| 6,188,141 B1 | 2/2001 | Daviaud | |
| 6,194,997 B1 | 2/2001 | Buchner et al. | |
| 6,236,850 B1 | 5/2001 | Desai | |
| 6,386,447 B1 * | 5/2002 | Proefke et al. | 235/380 |
| 6,621,406 B2 * | 9/2003 | Kumano | 340/5.62 |
| 6,798,337 B2 | 9/2004 | Onuma et al. | |
| 6,944,528 B2 | 9/2005 | Nagano | |
| 6,946,949 B2 | 9/2005 | Heide et al. | |
| 2004/0217846 A1 | 11/2004 | Konno et al. | |

FOREIGN PATENT DOCUMENTS

| | | |
|---|---|---|
| EP | 0860353 | 8/1998 |
| EP | 1 211 170 | 6/2002 |
| EP | 1445180 | 8/2004 |
| FR | 2751293 | 1/1998 |
| JP | 60-117824 | 6/1985 |
| JP | 03-021575 | 1/1991 |
| JP | 03-217660 | 9/1991 |
| JP | 03-295777 | 12/1991 |
| JP | 04-011587 | 1/1992 |
| JP | 04-038246 | 2/1992 |
| JP | 10-317754 | 12/1998 |
| JP | 2000-103316 | 4/2000 |
| JP | 2000-104429 | 4/2000 |
| JP | 2001-012123 | 1/2001 |
| JP | 2001-278156 | 10/2001 |
| JP | 2001-349110 | 12/2001 |
| JP | 2001-349117 | 12/2001 |
| JP | 2002-201838 | 7/2002 |
| WO | WO 02/29734 | 4/2002 |

* cited by examiner

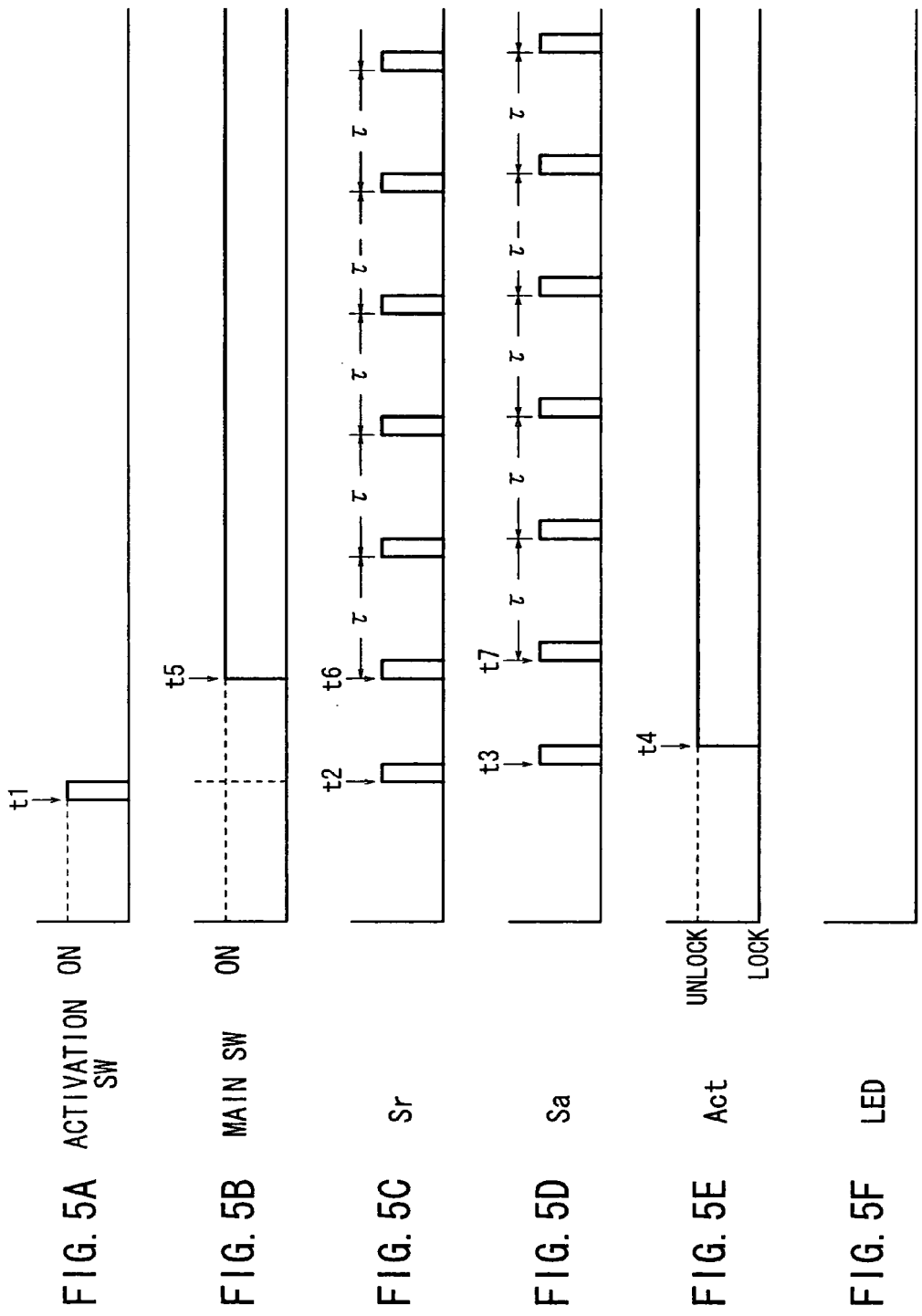

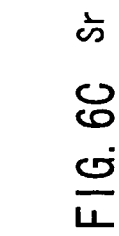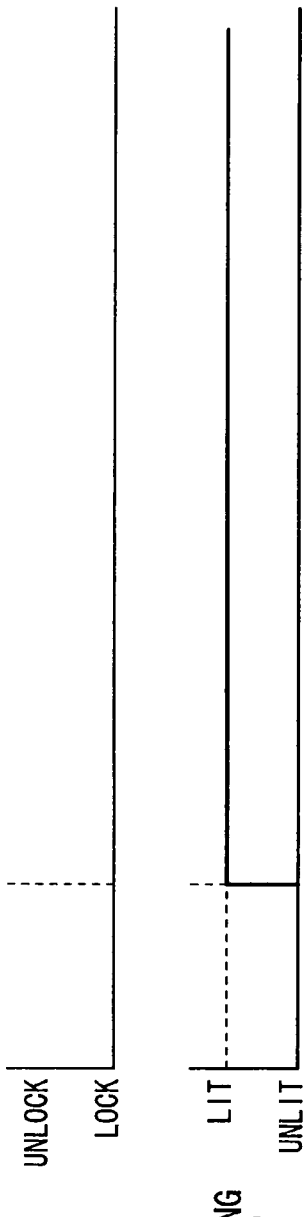

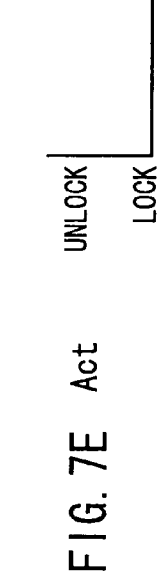
FIG. 7A ACTIVATION SW
FIG. 7B MAIN SW
FIG. 7C Sr
FIG. 7D Sa
FIG. 7E Act
FIG. 7F WARNING LAMP

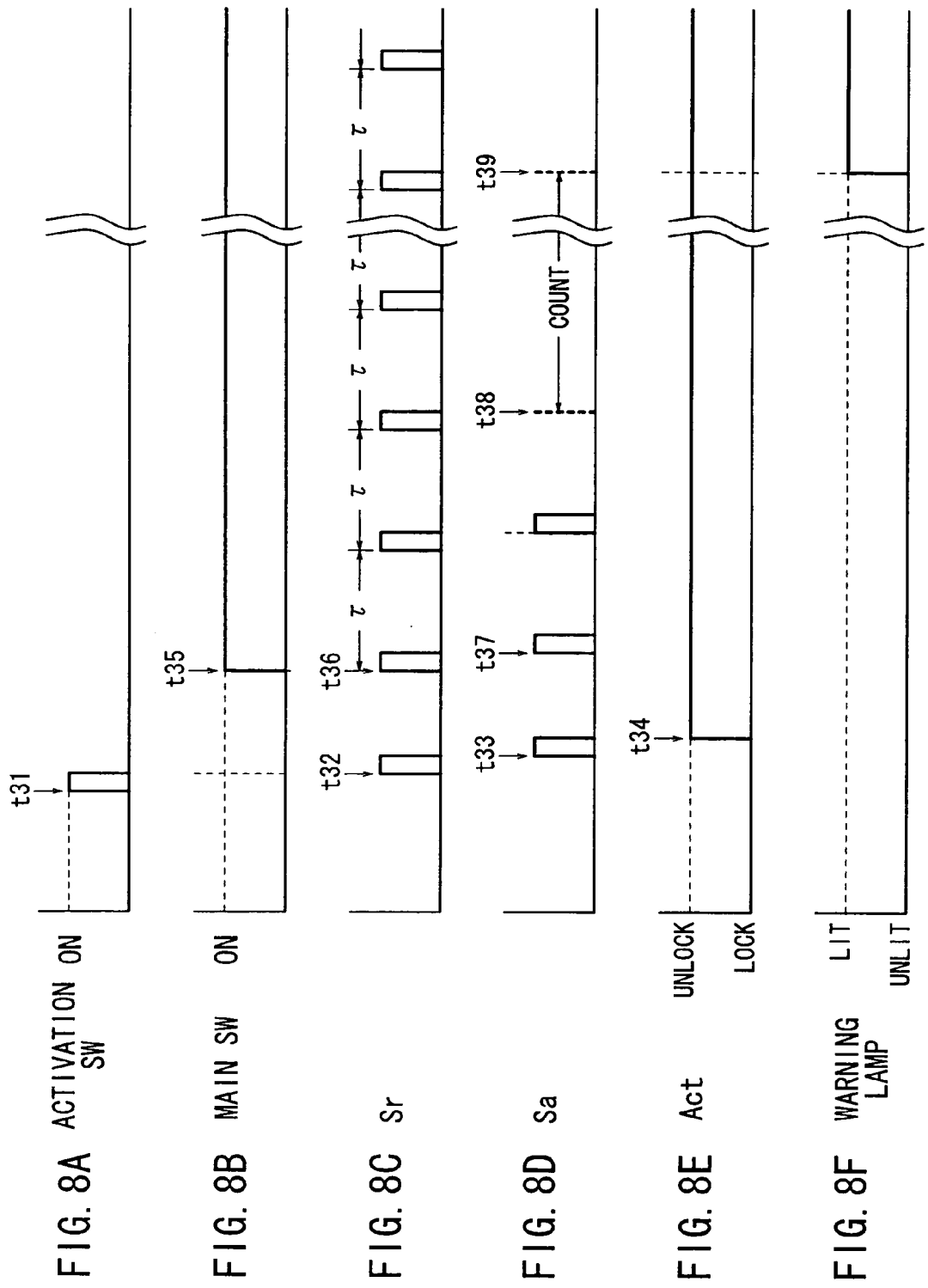

VEHICLE ELECTRONIC KEY SYSTEM

TECHNICAL FIELD

The present invention relates to an electronic key system for carrying out wireless communication between a transceiver (electronic key) carried by a user and a controller mounted on the vehicle, and, when an ID is compared and there is a request from the normal user, starting the engine etc., the invention being suitable for use as, for example, an electronic key system for a vehicle such as a motorcycle.

BACKGROUND ART

Japanese Laid-Open Patent Publication No. 2001-349110 and Japanese Laid-Open Patent Publication No. 2001-349117 exist as known examples of electronic key systems for a vehicle. The electronic key systems for a vehicle disclosed in these patent documents have activation means (switches) arranged in a door handle and trunk lid of the vehicle. If a user operates (activates) these activation means, communication with the electronic key commences, comparison is carried out between an ID transmitted from the electronic key and an ID registered in the controller, and a door lock is released at a stage when a result is obtained that there is ID matching.

Also, in the patent documents mentioned above, an activation means (a switch) is also provided in an ignition knob, and after a user has boarded a four-wheeled vehicle, communication with the electronic key is carried out again, by operation of the ignition knob, and an ID comparison is carried out in order to allow the engine to be started. Then, when results of the ID matching comparison have been obtained, the engine is started.

That is, with the electronic key system for a four-wheeled vehicle of the related art, the electronic key has functions for unlocking a door and allowing starting of the engine.

An electronic key system that has a transmission antenna provided for each door of a four-wheeled vehicle, which can release only the door that a portable device is closest to independently of the other doors of the vehicle, has also been proposed as related art (see, for example, Japanese Laid-Open Patent Publication No. 10-317754).

Also, as an electronic key system applied to a motorcycle, a system has been proposed that is intended to achieve reliable theft prevention, by generating a random number based on a time taken from a power supply of an immobilizer turning ON to starting of the engine (start time data), generating an authentication key and an authentication code by encoding information inherent to the key based on the random number, and carrying out authentication using the authentication key and the authentication code (see, for example, Japanese Laid-Open Patent Publication No. 2001-12123).

Since the electronic key is carried by the user, there is a danger of the key being dropped inside the vehicle when the key is not in use. In the case of a four-wheeled vehicle, however, there is only a very low possibility of the electronic key being lost after use, even if it is dropped inside the vehicle.

However, when the electronic key system for a four-wheeled vehicle is applied, as is, to a motorcycle, for example, if the electronic key is dropped by the user after starting the engine, there is not a problem if it is noticed that the key has been dropped. However, if the motorcycle moves without noticing that the key has been dropped, the key may become lost and it will not be possible to restart the engine.

In the related art, in a system that has been applied to a motorcycle, theft prevention is a main consideration, and for example, after boarding the vehicle once authentication of the normal user is complete, the security system is stopped. As a result, if the electronic key is dropped during travel, for instance, there is a danger that it will not be detected.

Naturally, even with a four-wheeled vehicle, if the electronic key is dropped close to the door, the probability of the electronic key becoming lost is high, and in this case also, it will not be possible to restart the engine.

The present invention has been conceived in view of these types of problems, and an object of the present invention is to provide an electronic key system for a vehicle that can output a warning if a user drops an electronic key while the vehicle is stopped or during travel, and that can reduce, to as low as possible, the probability of the electronic key being lost when dropped by the user.

DISCLOSURE OF THE INVENTION

An electronic key system of the present invention has a transmission antenna, a controller connected to the transmission antenna and a portable transceiver for transmitting ID data based on a request signal transmitted from the controller through the transmission antenna, wherein the controller receives the ID data through a receiving antenna, the electronic key system for a vehicle further comprising first means which outputs a first request signal to the portable transceiver based on activation of the controller, second means which outputs a second request signal to the portable transceiver following the first request signal, and in response to an ON operation of a start switch for the vehicle, third means for detecting the ID data from the portable transceiver based on the request signal, and fourth means for warning an operator when the ID data is not received from the portable transceiver even though the first request signal has been outputted from the first means and warning the operator when the ID data is not received from the portable transceiver, even though the second request signal has been outputted from the second means, wherein when the ID data is detected in response to the first request signal, the controller allows power to be supplied to electrical component drive circuits, and wherein when the ID data is detected in response to the second request signal, the controller allows power to be supplied to the vehicle such that vehicle travel is possible.

In this way, first of all a request signal is output from the first means as a result of ON operation of a start switch for the vehicle by the user. If the user is holding the portable transceiver, a request signal from the controller is received by the portable transceiver. The portable transceiver transmits an acknowledgement signal based on receipt of the request signal from the controller. The acknowledgement signal output from the portable transceiver is detected by the second means of the controller in the vehicle, and in that case, the engine is started without outputting a warning.

On the other hand, if the user is not holding the portable transceiver, or has dropped it and has not noticed, if the start switch is turned ON then since the second means does not detect the acknowledgement signal, regardless of whether or not a request signal is output from the first means, a warning is output through the third means and the user will notice that they are not holding the portable transceiver.

In this way, with the present invention, during the step of starting the vehicle, even if the user has dropped the portable transceiver, it is possible to make the user aware of this fact, and thus it is possible to reduce the probability of the portable transceiver becoming lost.

Also, another aspect of the electronic key system for a vehicle of the present invention, is that it includes a controller mounted on the vehicle, and a portable transceiver for transmitting an acknowledgement signal based on receipt of a request signal from the controller, the controller comprising first means for outputting a request signal to the portable transceiver every fixed period of time, second means for detecting an acknowledgement signal from the portable transceiver based on the request signal, and third means for outputting a warning when the acknowledgement signal is not detected in the second means.

In this way, first of all a request signal is output every fixed period of time through the first means. In the event that the user is holding the portable transceiver; an acknowledgement signal is output every fixed period of time in response to the request signal from the controller. The acknowledgement signal output from the portable transceiver is detected by the second means of the controller in the vehicle, and in this case, a warning is not output.

On the other hand, during travel of the vehicle, for example, in the event that the user has dropped the portable transceiver, since an acknowledgement signal is not detected by the second means, this time a warning signal is output by the third means, and thus the user can be made aware of the fact that the portable transceiver has been dropped.

In this way, with the present invention, in the event that the user drops the portable transceiver during travel of the vehicle, this fact can be notified to the user and it is possible to reduce the probability of the portable transceiver becoming lost.

Another aspect of the electronic key system for a vehicle of the present invention is that it has a controller mounted on the vehicle and a portable transceiver for transmitting an acknowledgement signal based on receipt of a request signal from the controller, the controller comprising first means for outputting a first request signal to the portable transceiver based on an ON operation of a start switch for the vehicle, second means for detecting an acknowledgement signal from the portable transceiver based on the first request signal or a second request signal, third means for outputting a warning when the acknowledgement signal is not detected in the second means in response to said first request signal, regardless of output of the second request signal from a fourth means, the fourth means for outputting the second request signal to the portable transceiver every fixed period of time during travel of the vehicle, and fifth means for outputting a warning when the acknowledgement signal is not detected in the second means in response to said second request signal from the fourth means.

In this way, even if the user drops the portable transceiver when starting the vehicle or during travel of the vehicle, it is possible to make the user aware of that fact, and it is possible to make the probability of losing the portable transceiver extremely small.

In the invention described above, the output period for the request signal from the first means can be from 10 to 100 seconds. If the output period of the request signal is short, it is possible to improve precision of checking whether or not the user is holding the portable transceiver. However, a battery is provided in the portable transceiver and the acknowledgement signal is output using electrical power from the battery. Therefore, as the period of the output signal becomes shorter, battery power is consumed and it will be necessary to replace the battery sooner.

By making the output period of the request signal from 10 to 100 seconds, it is possible to reduce battery consumption in the portable transceiver, and to reduce the frequency with which the battery is replaced.

Also, the third means can count the periods for which the acknowledgement signal is not detected, and output a warning at a point in time when the count value becomes a specified value or greater. Since there will be cases when arrival of the acknowledgement signal at the second means is delayed, or the acknowledgement signal itself may be missing due to effects of noise etc. during travel, it is possible to prevent frequent warning outputs by retaining a dead zone to a certain extent.

Also, in the invention described above, it is possible for the controller to further comprise sixth means for outputting a request signal to the portable transceiver based on activation of the controller, and seventh means for releasing a locked state of the vehicle when an acknowledgement signal from the portable transceiver is detected in the second means based on the request signal from the sixth means.

If activation of the controller is carried out before turning the start switch ON, it is possible to check whether or not the user is holding the portable transceiver in three situations, namely, when activating the controller, when turning the start switch ON, and during travel of the vehicle.

As a result, even if the electronic key system for a vehicle of the present invention is applied to a motorcycle, for example, in the event that the user drops the portable transceiver, that fact can be notified to the user and it is possible to make the probability of the portable transceiver becoming lost extremely low.

BRIEF DESCRIPTION OF THE DRAWINGS

FIGS. 5A through 5F are timing charts showing normal processing operations of the electronic key system of the embodiment;

FIGS. 6A through 6F are timing charts showing processing operations for the case where it is detected that there is no electronic key at the time of starting a vehicle, in the electronic key system of this embodiment;

FIGS. 7A through 7F are timing charts showing processing operations for the case where it is detected that there is no electronic key at the time of starting a vehicle engine, in the electronic key system of this embodiment; and FIGS. 8A through 8F are timing charts showing processing operations for the case where it is detected that there is no electronic key during vehicle travel, in the electronic key system of this embodiment.

DETAILED DESCRIPTION OF THE INVENTION

Embodiments of the electronic key system for a vehicle of the present invention applied to a system for a motorcycle (hereinafter, simply referred to as electronic key system embodiments) will now be described with reference to FIGS. 1 through 8F.

Figure 1:
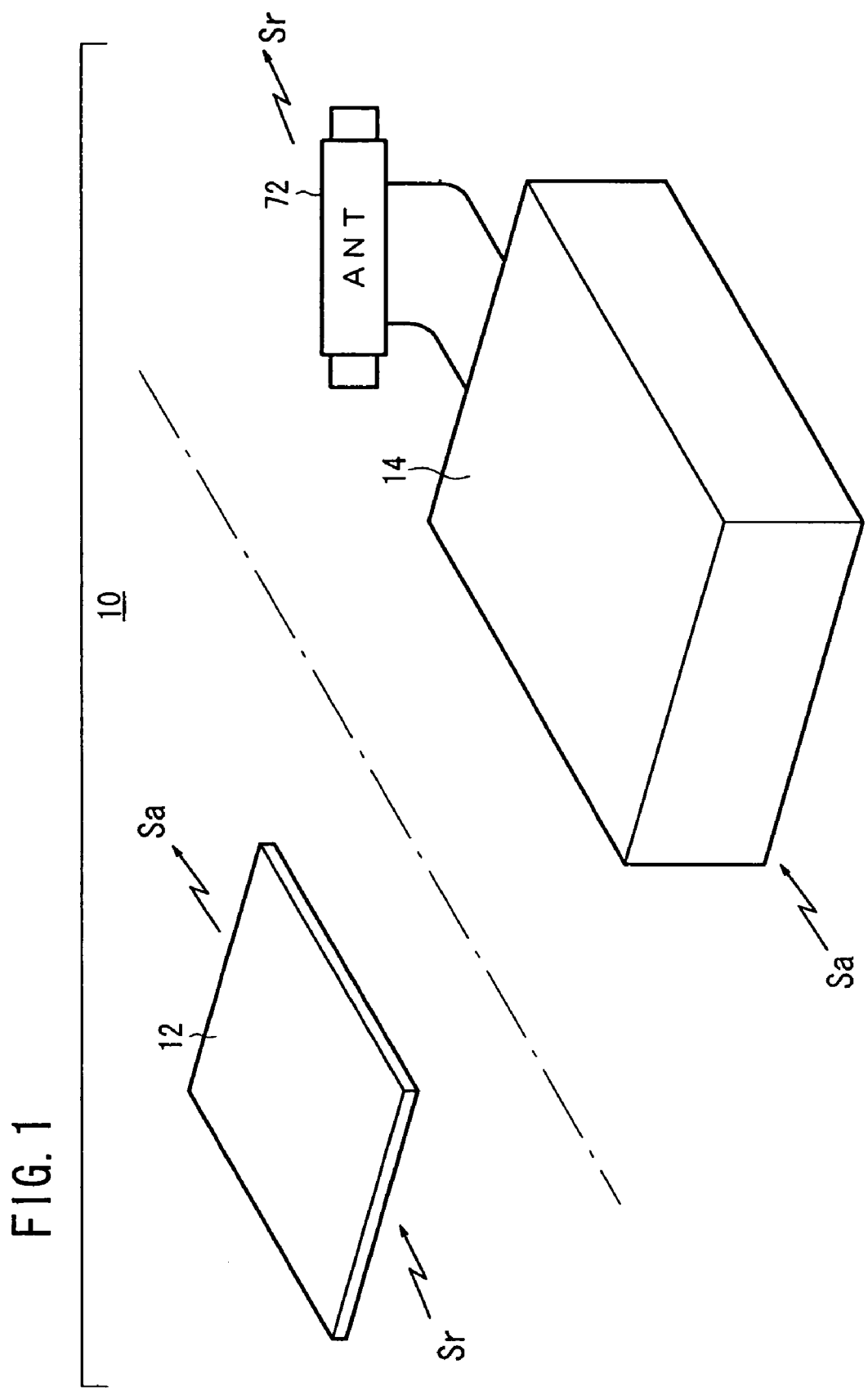
FIG. 1 is a structural drawing showing an electronic key system of a first embodiment.

As shown in FIG. 1, an electronic key system 10 of this embodiment comprises a portable transceiver 12 carried by a user, and a controller 14 mounted on the vehicle. The portable transceiver 12 can be either a key type having an IC chip built-in or a card type having an IC chip built in, however, in the case where a keyless system is adopted, the card type is mainly used. In this embodiment, a description will be given assuming that the portable transceiver 12 comprises a card type. Also, since the portable transceiver 12 is generally called an electronic key, in the following description, the portable transceiver will also be referred to as an electronic key.

The electronic key 12 is a card type, as described above, and as shown in FIG. 2, internally comprises a battery 20, a power supply circuit 22, a CPU 24, a receiving circuit 26 and a transmission circuit 28.

The power supply circuit 22 provides electrical power from the battery 20 to the receiving circuit 26, transmission circuit 28 and CPU 24. The receiving circuit 26 has a receiving antenna, not shown, and receives a request signal Sr or the like transmitted through the receiving antenna from the controller 14, and extracts and demodulates it from a carrier wave. The demodulated signal is supplied to the CPU 24. The carrier wave frequency of the request signal Sr is 100 kHz to 300 kHz.

The CPU 24 executes at least two computer programs (request signal comparison means 30 and acknowledgement signal generating means 32). The request signal comparison means 30 compares whether or not a signal supplied from the receiving circuit 26 is the request signal Sr, and if it is the request signal Sr, transfers control to the acknowledgement signal generating means 32. The acknowledgement signal generating means 32 reads out ID data stored in a ROM, not shown, in response to a request from the request signal comparison means 30, and adds an attribute representing acknowledgment to the ID data for output as transmission data Dt to the transmission circuit 28. The transmission circuit 28 has a transmission antenna, not shown, and performs modulation of a carrier wave based on transmission data Dt supplied from the CPU 24, for transmission as an acknowledgement signal Sa through the transmission antenna. The carrier frequency for the acknowledgement signal Sa is 200 MHz to 500 MHz.

Figure 3:
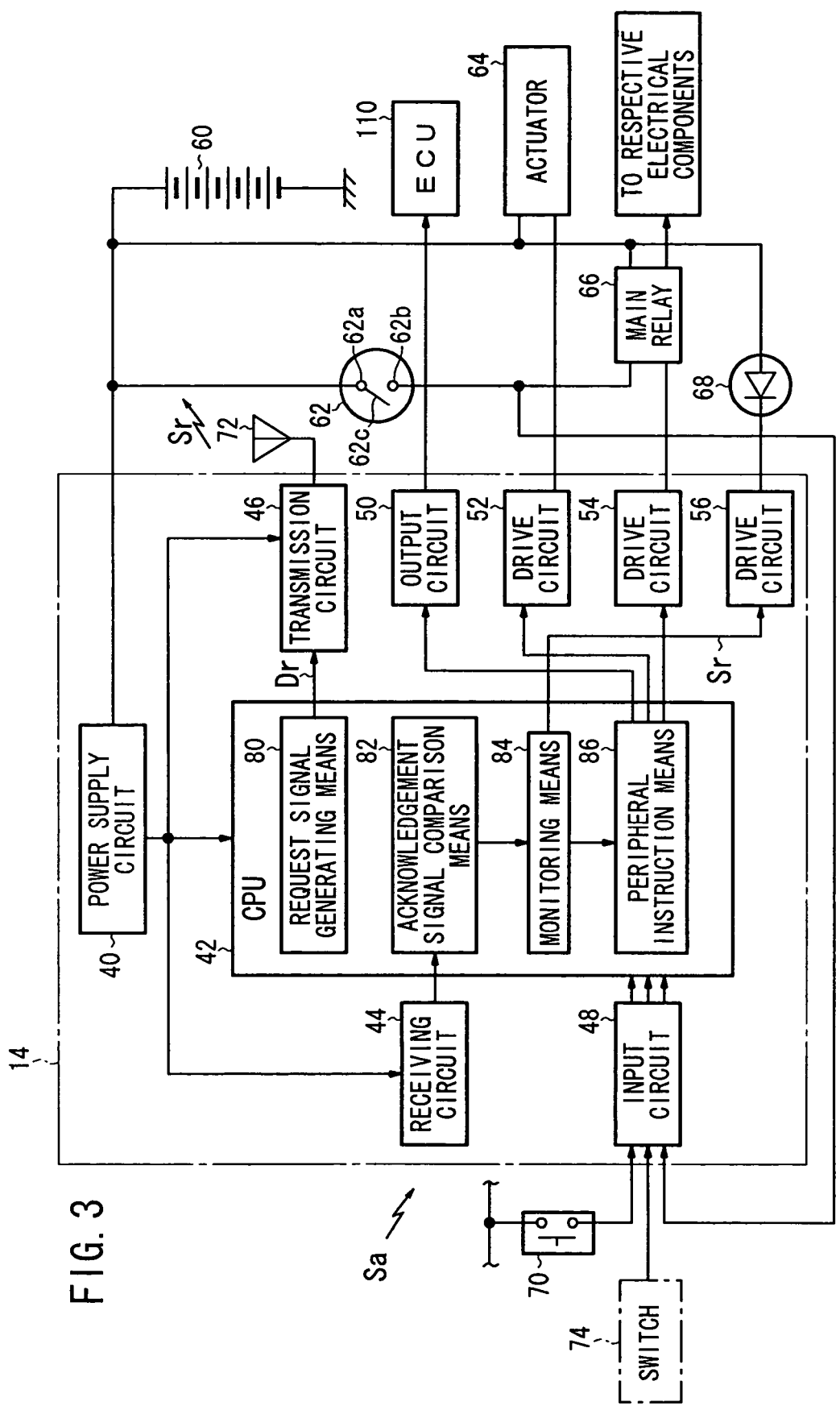
FIG. 3 is a block diagram showing the structure of a controller.

On the other hand, as shown in FIG. 3, the controller 14 mounted in the vehicle is constituted by a system LSI, for example, and comprises a power supply circuit 40, a CPU 42, a receiving circuit 44, a transmission circuit 46, an input circuit 48, an output circuit 50, a first drive circuit 52 (actuator drive), a second drive circuit 54 (main relay drive), and a third drive circuit 56 (LED drive). Peripheral to this controller 14, there are provided at least a battery 60, a main-switch 62, a handlebar actuator 64, a main relay 66, a warning lamp 68 (LED), an activation switch 70 and a transmission antenna 72.

The main switch 62 has two fixed connection points 62a and 62b, and one movable connection point 62c, with one fixed connection point 62a being connected to the battery 60, and the other fixed connection point 62b being connected to the input circuit 48 and the main relay 66.

As well as the other fixed connection point 62b of the main switch 62, the activation switch 70 is also connected to the input circuit 48. A starter switch 74 is connected to this input circuit 48, and operation is caused by an ON operation of the starter switch 74. In the following description, description will mainly focus on the case where processing operations are carried out based on operation of the main switch 62.

ON/OFF states of the activation switch 70 and ON/OFF states of the main switch 62 are supplied to the CPU 42 through the input circuit 48.

The power supply circuit 40 of the controller 14 supplies electrical power from the battery 60 to the CPU 42, the receiving circuit 44, and the transmission circuit 46, etc.

The receiving circuit 44 has a receiving antenna, not shown, and an acknowledgement signal Sa is received from the electronic key 12 through the receiving antenna, and extracted and demodulated from a carrier wave. The demodulated signal is supplied to the CPU 42.

The CPU 42 executes at least four programs (request signal generating means 80, acknowledgement signal comparison means 82, monitoring means 84 and peripheral instruction means 86).

The request signal generating means 80 reads out request data Dr (data constituting the source of the request signal Sr) from a ROM, not shown, in response to the ON operation of the activation switch 70 and ON operation of the main switch 62, for output to the transmission circuit 46. Also, after starting the engine, the request signal generating means 80 reads out request data Dr from the ROM every fixed time and outputs the data. The fixed time is set to between 10 and 100 seconds, taking into consideration consumption of the battery by the electronic key 12.

The transmission circuit 46 modulates a carrier wave based on the request data Dr supplied from the CPU 42, and transmits, via the transmission antenna 72, a request signal Sr.

Figure 4B:
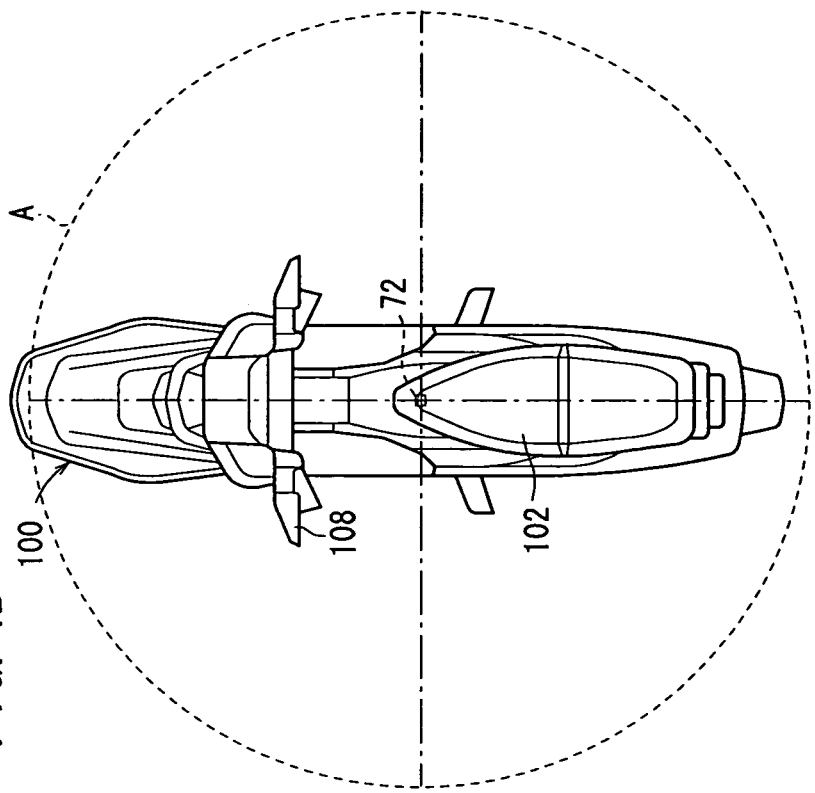
FIG. 4B is a plan view of the same.
Figure 4A:
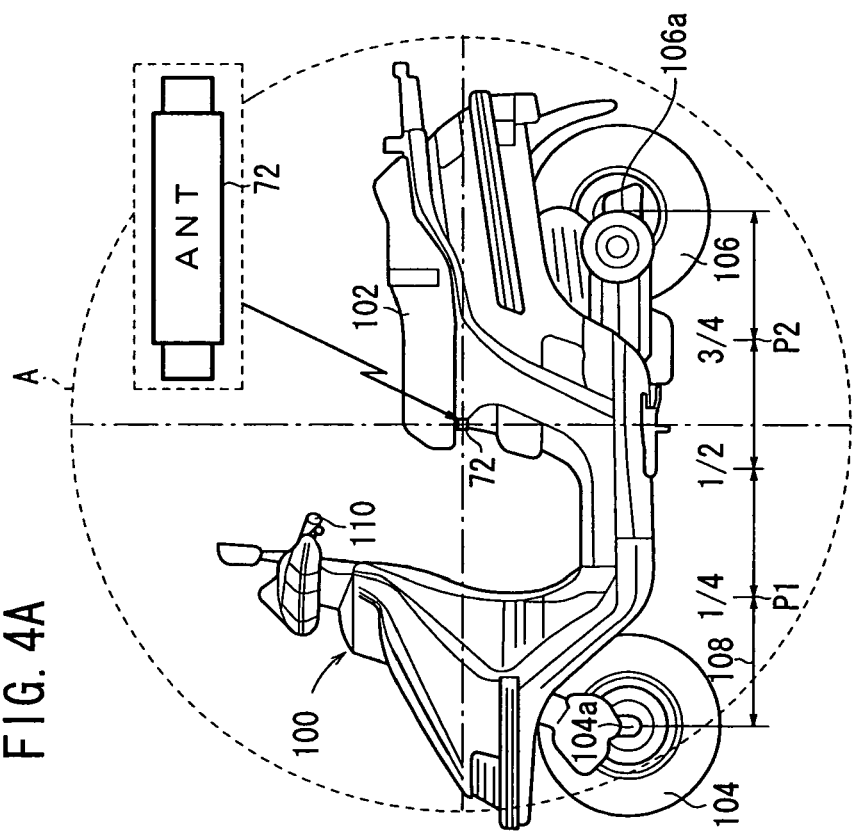
FIG. 4A is a side elevation showing one example of a setting position for a transmission antenna on the vehicle.

As shown in FIG. 4A and FIG. 4B, the transmittable range of the request signal Sr is a spherical range (the range shown by circle A in FIG. 4A and FIG. 4B) of a diameter of 1-1.5 m with the transmission antenna 72 fitted to the vehicle 100 at the center, and is a narrow range compared to the transmittable range of the acknowledgement signal Sa (a range of a few m radius with the electronic key 12 as the center).

Therefore, as shown in FIG. 4A and FIG. 4B, if it is assumed that the vehicle 100 is, for example, a scooter provided with a space that can hold a helmet, not shown, below a seat 102, it is preferable to provide the transmission antenna 72 close to the center of the vehicle 100 so that when the user boards the vehicle, opens the seat 102, or is traveling, etc., communication is reliably established with the electronic key 12 carried by the user.

Here, when considering a linking line 108 of the center 104a of the front wheel 104 and the center 106a of the rear wheel 106, the vicinity of the center of the vehicle 100 is a range from a point P1 that is ¼ of the line to a point P2 that is ¾ of the line, with the center 104a of the front wheel 104 as a reference, for example. With this embodiment, the transmission antenna 72 is arranged close to the front of the seat 102.

The acknowledgement signal comparison means 82 compares whether or not a signal supplied from the receiving circuit 44 is an acknowledgement signal Sa, and if it is the acknowledgement signal Sa, it compares whether or not ID data contained in the acknowledgement signal Sa matches ID data stored in a memory, not shown.

The monitoring means 84 monitors presence or absence of arrival of an acknowledgement signal Sa (whether or not an ID match is detected by the acknowledgement signal comparison means 82) based on output of the request signal Sr. The request signal generating means 80 awaits input of the acknowledgement signal Sa from the point in time where request data Dr is output, and if an acknowledgement signal Sa does not arrive within a specified time (if an ID match is not detected by the acknowledgement signal comparison means 82), the count value is incremented by 1. At the point in time that the count value becomes a specified value or greater, a warning signal Se is output to the third drive circuit 56.

In particular, if an acknowledgement signal Sa does not arrive within a specified time from the point in time where request data Dr is output based on the ON operation of the activation switch 70 and the main switch 62, at that stage the warning signal Se is output to the third drive circuit 56.

Also, if an acknowledgement signal Sa does arrive within a specified time from the point in time where request data Dr is output based on the ON operation of the activation switch 70, the monitoring means 84 activates the peripheral instruction means 86. The peripheral instruction means 86 outputs a lock release signal to the first drive circuit 52 in response to a request (lock release) from the monitoring means 84, outputs an enabling signal to the output circuit 50, and also outputs an ON signal to the second drive circuit 54.

The first drive circuit 52 drives an actuator 64 for the handlebar in response to input of the lock release signal from the CPU 42, and releases a locked state of the handlebar 110 (refer to FIG. 4A and FIG. 4B).

The output circuit 50 outputs an ignition/injection enabling signal to an ECU 111 (electronic control unit) in response to input of the enabling signal from the CPU 42. The ECU 111 determines fuel injection amount and injection timing for the engine based on information from various sensors, in response to input of the ignition/injection enabling signal.

The second drive circuit 54 is put into an ON state based on input of an ON signal from the CPU 42, and after that starts the engine and enters a travel possible state in a step where the main relay 66 is turned on by an ON operation of the main switch 62.

The third drive circuit 56 drives the warning lamp 68 in response to input of the warning signal Se from the CPU 42, and the warning lamp 68 emits light. It is possible to use an LED, for example, as the warning lamp 68.

If the main switch 62 is turned OFF, the main relay 66 becomes OFF, and the engine is also stopped at the same time. If a locking operation is then carried out, for example, putting the handlebar 110 in a locked state, the comparison operation for the acknowledgement signal Sa in the controller 14 is stopped, the ignition/injection enabling signal from the output circuit 50 is stopped, and the second drive circuit 54 is turned OFF.

Next, four representative processing operations of the electronic key system 10 of the first embodiment will be described with reference to the timing charts of FIG. 5A to FIG. 8F. A request signal Sr is a signal having a pulse string based on request data Dr, and the acknowledgement signal Sa is a signal having a pulse string based on data contained in ID data, but in FIG. 5A to FIG. 8F, they have each been shown as single pulse signals to simplify description.

First of all, normally, if the activation switch 70 is turned ON at time t1 in FIG. 5A with the user holding the electronic key 12, then as shown in FIG. 5C the request signal Sr is transmitted from the controller 14 (refer to time t2) and communication with the electronic key 12 commences.

Figure 2:
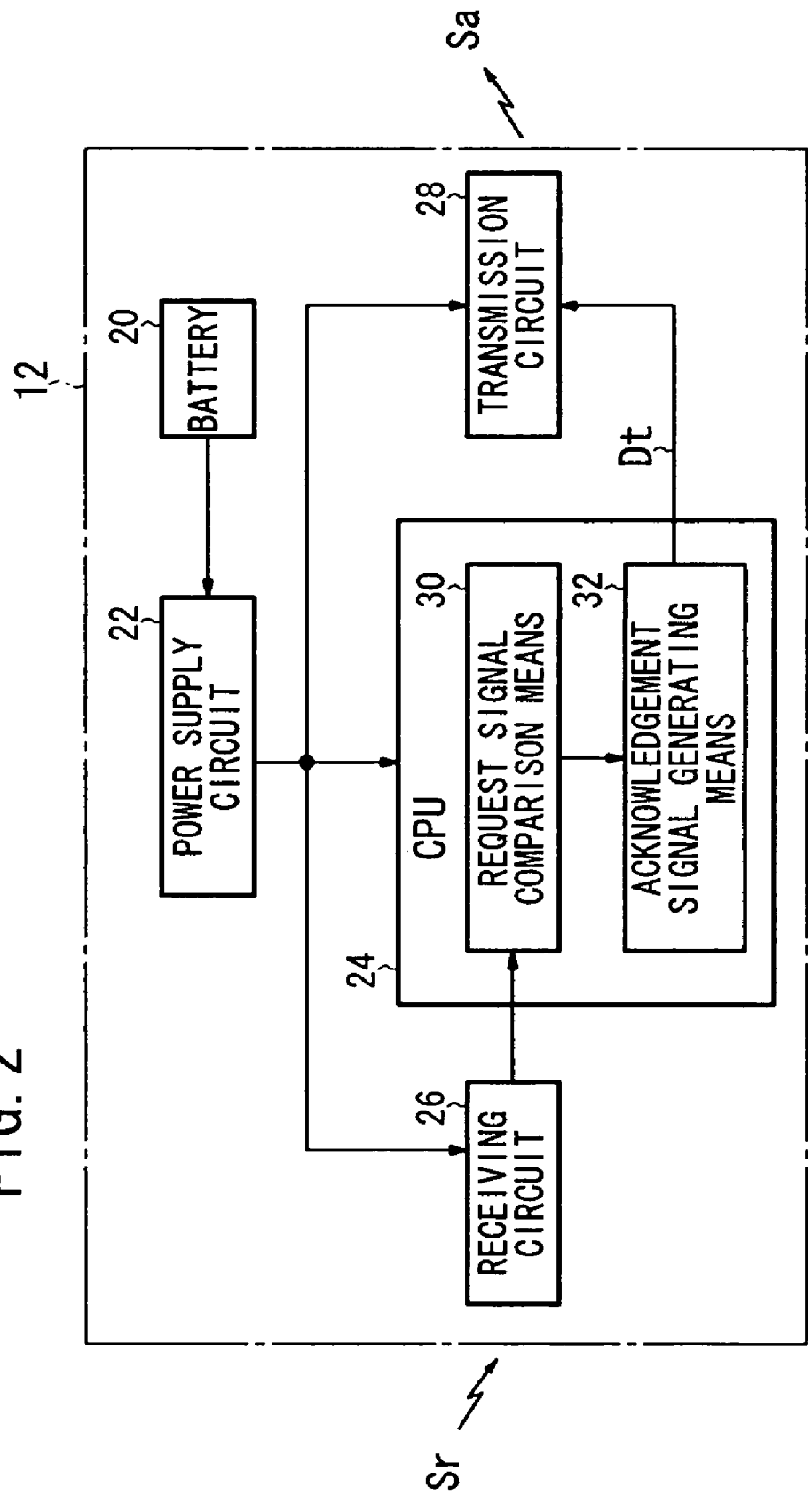
FIG. 2 is a block drawing showing the structure of an electronic key.

When the user is in possession of the electronic key 12, the request signal Sr is received by means of the receiving circuit 26 of the electronic key 12 (refer to FIG. 2). As shown in FIG. 5D, the electronic key 12 transmits an acknowledgement signal Sa in response to receipt of the request signal Sr (refer to time t3). The acknowledgement signal Sa is supplied through the receiving circuit 44 of the controller 14 to the CPU 42 (refer to FIG. 3), and ID data included in the acknowledgement signal Sa is compared. When it is judged that the ID data matches, the locked state of the handlebar 110 is released (unlocked) by means of the controller 14 and the first drive circuit 52, as shown in FIG. 5E (refer to time t4). At this time, the second drive circuit 54 is turned ON, and the ignition/injection enabling signal is output from the output circuit 50 of the controller 14 to the ECU 111.

Continuing on, at time t5 in FIG. 5B, if the main switch 62 is turned ON with the user holding the electronic key 12, then as shown in FIG. 5C the request signal Sr is transmitted from the controller 14 (refer to time t6) and communication with the electronic key 12 is carried out.

When the user is carrying the electronic key 12, then in the same way as described above, as shown in FIG. 5D, the electronic key 12 transmits the acknowledgement signal Sa in response to receipt of the request signal Sr (refer to time t7). The acknowledgement signal Sa is supplied to the CPU 42 via the receiving circuit 44 of the controller 14, ID data contained in the acknowledgement signal Sa is compared, and if it is judged that ID data matches, then control transfers to the next step, namely a step where the request signal Sr is output every fixed time +τ.

From this stage, the vehicle 100 is traveling, and during this travel the request signal Sr is output from the controller 14 every fixed time τ. That is, communication with the electronic key 12 is carried out every fixed time τ, and an acknowledgement signal Sa is output from the electronic key 12 at substantially every fixed time τ.

Next, the processing operation when it has been detected that there is no electronic key 12 at the time the vehicle 100 is started will be described with reference to FIGS. 6A through 6F.

First of all, at time t11 in FIG. 6A, if the activation switch 70 is turned ON while the user is not holding the electronic key 12, as shown in FIG. 6C, the request signal Sr is transmitted from the controller 14 (refer to time t12), but in the controller 14 there is no receipt of an acknowledgement signal Sa corresponding to the output request signal Sr (refer to time t13 in FIG. 6D). As a result, the warning signal Se is output from the monitoring means 84 to the third drive circuit 56, and in this way, as shown in FIG. 6F, the warning lamp 68 is lit. Naturally, in this case, processing such as lock release for the handlebar 110 etc. is not carried out (refer to FIG. 6E).

The user notices that the electronic key 12 is not being carried because of the lighting of the warning lamp 68, and starting the engine while not holding the electronic key 12 can be avoided.

Next, a description will be given, with reference to FIGS. 7A through 7F, of processing operations when the electronic key 12 has not been detected at the time of starting the vehicle 100.

First of all, at time t21 in FIG. 7A, if the activation switch 70 is turned ON while the user is holding the electronic key 12, then as shown in FIG. 7C the request signal Sr is transmitted from the controller 14 (refer to time t22), and communication with the electronic key 12 commences.

When the user is in possession of the electronic key 12, the request signal Sr is received by means of the receiving circuit 26 of the electronic key 12, and as shown in FIG. 7D, the electronic key 12 transmits an acknowledgement signal Sa (refer to time t23). ID data included in the acknowledgement signal Sa is compared in the controller 14, and when it is judged that the ID data matches, the locked state of the handlebar 110 is released, as shown in FIG. 7E (refer to time t24). At this time, the second drive circuit 54 is turned ON, and the ignition/injection enabling signal is output from the output circuit 50 of the controller 14 to the ECU 111.

Continuing on, at time t25 in FIG. 7B, if the main switch 62 is turned on without the user noticing that the electronic key 12 has been dropped, then as shown in FIG. 7C the request signal Sr is transmitted from the controller 14 (refer to time t26), and there is no receipt of an acknowledgement signal Sa corresponding to the output request signal Sr in the controller 14 (refer to time t27 in FIG. 7D). As a result, the warning signal Se is output from the monitoring means 84 to the third drive circuit 56, and in this way the warning lamp 68 is lit, as shown in FIG. 7F.

The user is made aware of the fact that the electronic key 12 has been dropped by the lighting of the warning lamp 68, and it is possible to avoid the electronic key 12 becoming lost.

Next, a description will be given, with reference to FIGS. 8A through 8F, of processing operations for the case where it is detected that there is no electronic key 12 during travel of the vehicle 100.

First of all, processing from switching on the activation switch 70 up to switching on the main switch 62 (processing from time t31 to time t37) is the same as the processing from time t1 to t7 in FIGS. 5A through 5F, and so description of this processing will be omitted.

If the engine is started in response to an ON operation of the main switch 62, control passes to a step for outputting the request signal Sr every fixed time $\tau$, as described above. From this stage, the user is traveling on the vehicle 100, and during such travel, the request signal Sr is output from the controller 14 every fixed time $\tau$.

While traveling on the vehicle 100, if the electronic key 12 is dropped, for example, receipt of the acknowledgement signal Sa is not carried out by the controller 14 (refer to time t38 in FIG. 8D). When the acknowledgement signal Sa is not received by the monitoring means 84 within a specified time from output of the request data Dr, the count value is incremented by 1. Then, in a process of sequentially outputting the request signal Sr, at time t39 when the count value becomes a specified value or higher, a warning signal Se is output from the monitoring means 84 to the third drive circuit 56, and in this way the warning lamp 68 is lit, as shown in FIG. 8F.

The user notices that the electronic key 12 has been dropped as a result of the lighting of the warning lamp 68, and it is possible to avoid the electronic key 12 becoming lost.

In this way, in the electronic key system 10 of this embodiment, in the event that the user turns the activation switch 70 on while not holding the electronic key 12, since it will be detected that the acknowledgement signal Sa is not received in the receiving circuit 44, regardless of output of the request signal Sr from the controller 14, a warning is output via the monitoring means 84, and the user will notice that he/she is not in possession of the electronic key 12.

If the user drops the electronic key 12 at the time of starting the engine, for example, since the acknowledgement signal Sa is not detected in the receiving circuit 44, regardless of output of the request signal Sr from the controller 14 in response to the main switch 62 being turned on, a warning is output via the monitoring means 84 and the user will notice that they have dropped the electronic key 12.

If the user drops the electronic key 12 during travel of the vehicle 100, since the acknowledgement signal Sa is not detected in the receiving circuit 44, regardless of output of the request signal Sr from the controller 14 at every fixed time $\tau$, a warning is output via the monitoring means 84 and the user will notice that they have dropped the electronic key 12.

In this way, it is possible to check whether or not the user is holding the electronic key 12 during at least three stages, namely when starting the controller 14, when turning ON the main switch 62, and during travel of the vehicle 100.

As a result, even if the electronic key system 10 of this embodiment is applied to a motorcycle, for example, in the event that the user drops the electronic key 12, that fact can be made known to the user and it is possible to make the probability of losing the electronic key 12 extremely low.

In particular, with the embodiment described above, the output period $\tau$ for the request signal Sr from the controller 14 is set at 10 to 100 seconds. If the output period $\tau$ of the request signal Sr is made short, it is possible to improve precision of checking whether or not the user is in possession of the electronic key 12. However, a battery 20 is provided in the electronic key 12 and the acknowledgement signal Sa is output using electrical power from the battery 20. Therefore, as the output period $\tau$ of the request signal Sr becomes shorter, battery consumption increases and the battery 20 must be replaced more often.

By setting the output period $\tau$ of the request signal Sr at 10 to 100 seconds, it is possible to reduce consumption of the battery in the electronic key 12, and it is possible to reduce the frequency with which the battery 20 needs to be replaced.

Also, with this embodiment, the periods in which the acknowledgement signal Sa is not detected during travel of the vehicle 100, for example, are counted, and a warning is output when that count value is a specified value or higher. Since there will be times when arrival of the acknowledgement signal Sa is delayed, or the acknowledgement signal Sa itself is missing due to the effects of noise etc. during travel, it is possible to prevent frequent warning output by causing a particular dead-zone to be held.

With the above-described example, lighting of a dedicated warning lamp 68 has been given as an example of warning output, but it is also possible to output a warning sound using a dedicated buzzer.

Alternatively, it is possible to randomly light an indicator lamp inside an already existing meter, output a specified sound pattern by means of the horn, or cause a direction indicator to light up with a different lighting pattern from normal.

However, since the horn and the direction indicator are safety components, it is important not to operate them for the purpose of warning when starting the engine, and to use them as conventional safety components.

The electronic key system for a vehicle of the present invention is not limited to the above-described embodiments, and obviously various structures can be introduced without departing from the spirit and scope of the invention.

The invention claimed is:

1. An electronic key system for a vehicle, including a transmission antenna, a controller connected to the transmission antenna and a portable transceiver for transmitting ID data based on a request signal transmitted from the controller through the transmission antenna, wherein the controller receives the ID data through a receiving antenna, the electronic key system for a vehicle further comprising:

first means which outputs a first request signal to the portable transceiver based on activation of the controller;

second means which outputs a second request signal to the portable transceiver following the first request signal, and in response to an ON operation of a start switch for the vehicle;

third means for detecting the ID data from the portable transceiver based on the request signal; and fourth means for warning an operator when the ID data is not received from the portable transceiver, even though the first request signal has been outputted from the first means and warning the operator when the ID data is not received from the portable transceiver, even though the second request signal has been outputted from or the second means, wherein when the ID data is detected in response to the first request signal, the controller allows power to be supplied to electrical component drive circuits, and wherein when the ID data is detected in response to the second request signal, the controller allows power to be supplied to the vehicle such that vehicle travel is possible.

2. The electronic key system for a vehicle according to claim 1, further comprising fifth means for releasing a locked state of the vehicle when the controller receives the ID data transmitted from the portable transceiver based on the request signal from the first means.

3. An electronic key system for a vehicle, including a controller mounted on the vehicle and a portable transceiver for transmitting an acknowledgement signal based on receipt of a request signal from the controller, the controller comprising:

first means for outputting a first request signal to the portable transceiver based on an ON operation of a start switch for the vehicle;

second means for detecting an acknowledgement signal from the portable transceiver based on the first request signal or a second request signal;

third means for outputting a warning when the acknowledgement signal is not detected in the second means in response to said first request signal, regardless of output of the second request signal from a fourth means;

the fourth means for outputting the second request signal to the portable transceiver every fixed period of time during travel of the vehicle; and fifth means for outputting a warning when the acknowledgement signal is not detected in the second means in response to said second request signal from the fourth means.

4. The electronic key system for a vehicle according to claim 3, wherein an output period for the first request signal of the first means is in a range from 10 to 100 seconds.

5. The electronic key system for a vehicle according to claim 3, wherein the fifth means counts periods in which the acknowledgement signal is not detected, and outputs a warning at a point in time when the count becomes greater than a specified value.

6. The electronic key system for a vehicle according to claim 3, wherein the controller further comprises sixth means for outputting a request signal to the portable transceiver based on activation of the controller, and seventh means for releasing a locked state of the vehicle when an acknowledgement signal from the portable transceiver is detected in the second means based on the request signal from the sixth means.

* * * * *

UNITED STATES PATENT AND TRADEMARK OFFICE
CERTIFICATE OF CORRECTION

PATENT NO.        : 7,245,210 B2
APPLICATION NO.   : 10/529104
DATED             : July 17, 2007
INVENTOR(S)       : Konno Page 1 of 1

It is certified that error appears in the above-identified patent and that said Letters Patent is hereby corrected as shown below:

Delete Drawing FIG. 3, and substitute with Drawing FIG. 3 as shown below.

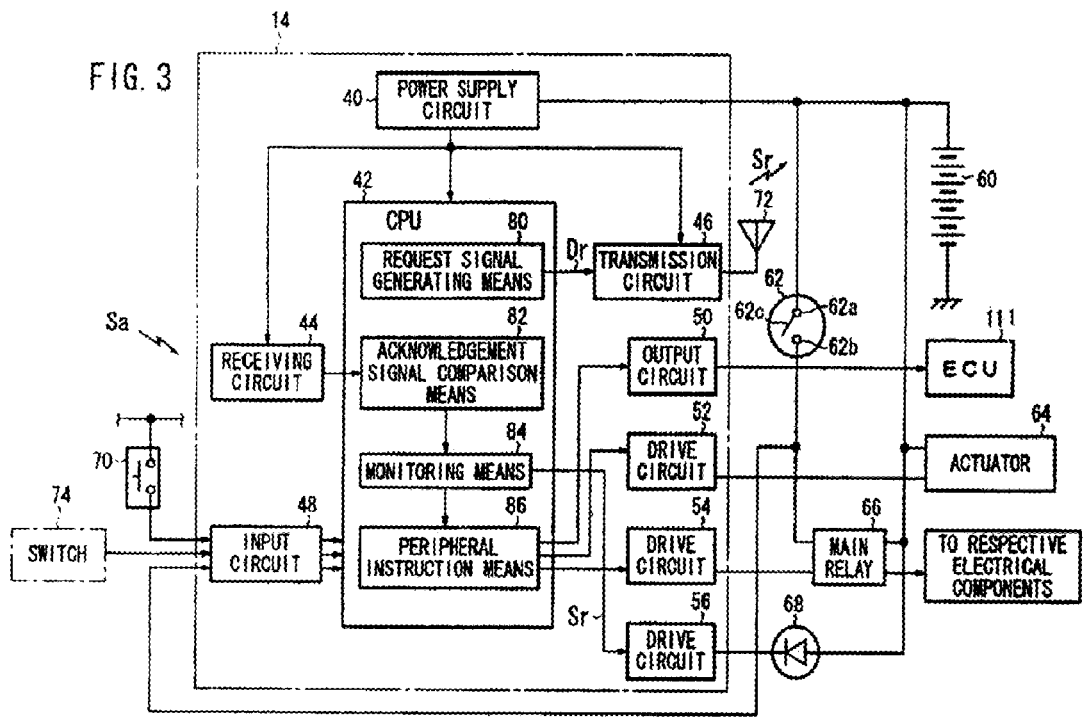

Signed and Sealed this

Seventeenth Day of June, 2008

JON W. DUDAS
*Director of the United States Patent and Trademark Office*